US011004320B1

(12) United States Patent
Jordan, II et al.

(10) Patent No.: US 11,004,320 B1
(45) Date of Patent: *May 11, 2021

(54) SYSTEMS AND METHODS FOR ANALYZING SENSOR DATA TO DETECT PROPERTY INTRUSION EVENTS

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Normal, IL (US); Torri Wollenschlager, Bloomington, IL (US); Bryan R. Nussbaum, Bloomington, IL (US); Deanna Stockweather, Normal, IL (US); Jeffrey W. Stoiber, Atlanta, GA (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Tempe, AZ (US); Jennylind Sun, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/700,783

(22) Filed: Dec. 2, 2019

Related U.S. Application Data

(63) Continuation of application No. 16/445,399, filed on Jun. 19, 2019, which is a continuation of application (Continued)

(51) Int. Cl.
*G08B 13/22* (2006.01)

(52) U.S. Cl.
CPC .................................. *G08B 13/22* (2013.01)

(58) Field of Classification Search
CPC ...................................................... G08B 13/22
See application file for complete search history.

(56) References Cited

U.S. PATENT DOCUMENTS 3,648,326 A 3/1972 Gaysowski
3,740,739 A 6/1973 Griffin, III et al.
(Continued)

FOREIGN PATENT DOCUMENTS

CN 202865924 U 4/2013
WO WO-2013/076721 A1 5/2013
WO WO-2014/207558 A2 12/2014

OTHER PUBLICATIONS

Knutsen, Confusion about causation in insurance: solutions for catastrophic losses, Ala. L. Rev., 5:957-1023 (2010).
System for Loss Prevention, Ip.com, published Nov. 8, 2008.

*Primary Examiner* — Quan-Zhen Wang
*Assistant Examiner* — Rajsheed O Black-Childress
(74) *Attorney, Agent, or Firm* — Marshall, Gerstein & Borun LLP

(57) ABSTRACT

The present embodiments relate to identifying property intrusion events based upon sensor data received from smart devices populated about a home. A smart home controller may compare the sensor data to baseline sensor data to dynamically identify an intrusion event that may be occurring. The controller may generate a notification and determine an action to perform to facilitate damage or risk mitigation. Accordingly, an individual associated with the home may be notified of the event, and then select to perform the action, such as via their mobile device. In some implementations, the controller may automatically perform (Continued)

the action. As a result, in response to computer identification of an intrusion event, corrective action may be taken or prompted, or otherwise any damage caused by the intrusion event may be mitigated, reducing insurance claims or claim amounts associated with intrusion events. Insurance discounts may be provided based upon the risk mitigation functionality.

14 Claims, 6 Drawing Sheets

Related U.S. Application Data

No. 14/873,823, filed on Oct. 2, 2015, now Pat. No. 10,388,135.

(60) Provisional application No. 62/220,383, filed on Sep. 18, 2015, provisional application No. 62/201,671, filed on Aug. 6, 2015, provisional application No. 62/200,375, filed on Aug. 3, 2015, provisional application No. 62/198,813, filed on Jul. 30, 2015, provisional application No. 62/197,343, filed on Jul. 27, 2015, provisional application No. 62/193,317, filed on Jul. 16, 2015, provisional application No. 62/189,329, filed on Jul. 7, 2015, provisional application No. 62/187,651, filed on Jul. 1, 2015, provisional application No. 62/187,624, filed on Jul. 1, 2015, provisional application No. 62/187,642, filed on Jul. 1, 2015, provisional application No. 62/187,666, filed on Jul. 1, 2015, provisional application No. 62/187,645, filed on Jul. 1, 2015, provisional application No. 62/105,407, filed on Jan. 20, 2015, provisional application No. 62/060,962, filed on Oct. 7, 2014.

(56) References Cited

U.S. PATENT DOCUMENTS

| | | | |
|---|---|---|---|
| 3,771,823 A | 11/1973 | Schnarr |
| 3,817,161 A | 6/1974 | Koplon |
| 3,875,612 A | 4/1975 | Poitras |
| 3,934,306 A | 1/1976 | Farris |
| 4,066,072 A | 1/1978 | Cummins |
| 4,418,712 A | 12/1983 | Braley |
| 4,688,026 A | 8/1987 | Scribner et al. |
| 5,005,125 A | 4/1991 | Farrar et al. |
| 5,038,268 A | 8/1991 | Krause et al. |
| 5,099,751 A | 3/1992 | Newman et al. |
| 5,128,859 A | 7/1992 | Carbone et al. |
| 5,267,587 A | 12/1993 | Brown |
| 5,554,433 A | 9/1996 | Perrone, Jr. et al. |
| 5,576,952 A | 11/1996 | Stutman et al. |
| 5,684,710 A | 11/1997 | Ehlers et al. |
| 5,903,426 A | 5/1999 | Ehling |
| 5,979,607 A | 11/1999 | Allen |
| 6,023,762 A | 2/2000 | Dean et al. |
| 6,084,367 A | 7/2000 | Landert |
| 6,155,324 A | 12/2000 | Elliott et al. |
| 6,222,455 B1 | 4/2001 | Kaiser |
| 6,237,618 B1 | 5/2001 | Kushner |
| 6,286,682 B1 | 9/2001 | d'Arbelles |
| 6,317,047 B1 | 11/2001 | Stein et al. |
| 6,526,807 B1 | 3/2003 | Doumit et al. |
| 6,553,336 B1 | 4/2003 | Johnson et al. |
| 6,812,848 B2 | 11/2004 | Candela |
| 6,934,692 B1 | 8/2005 | Duncan |
| 6,977,585 B2 | 12/2005 | Falk et al. |
| 6,998,960 B2 | 2/2006 | Buschmann et al. |
| 7,030,767 B2 | 4/2006 | Candela |
| 7,161,483 B2 | 1/2007 | Chung |
| 7,194,416 B1 | 3/2007 | Provost et al. |
| 7,259,656 B1 | 8/2007 | Wright |
| 7,309,216 B1 | 12/2007 | Spadola, Jr. et al. |
| 7,348,882 B2 | 3/2008 | Adamczyk et al. |
| 7,356,516 B2 | 4/2008 | Richey et al. |
| 7,395,219 B2 | 7/2008 | Strech |
| 7,598,856 B1 | 10/2009 | Nick et al. |
| 7,657,441 B2 | 2/2010 | Richey et al. |
| 7,683,793 B2 | 3/2010 | Li et al. |
| 7,715,036 B2 | 5/2010 | Silverbrook et al. |
| 7,809,587 B2 | 10/2010 | Dorai et al. |
| 7,813,822 B1 | 10/2010 | Hoffberg |
| 7,882,514 B2 | 2/2011 | Nielsen et al. |
| 8,010,992 B1 | 8/2011 | Chang et al. |
| 8,031,079 B2 | 10/2011 | Kates |
| 8,041,636 B1 | 10/2011 | Hunter et al. |
| 8,106,769 B1 | 1/2012 | Maroney et al. |
| 8,108,271 B1 | 1/2012 | Duncan et al. |
| 8,219,558 B1 | 7/2012 | Trandal et al. |
| 8,229,861 B1 | 7/2012 | Trandal et al. |
| 8,280,633 B1 | 10/2012 | Eldering et al. |
| 8,289,160 B1 | 10/2012 | Billman |
| 8,316,237 B1 | 11/2012 | Felsher et al. |
| 8,400,299 B1 | 3/2013 | Maroney et al. |
| 8,510,196 B1 | 8/2013 | Brandmaier et al. |
| 8,527,306 B1 | 9/2013 | Reeser et al. |
| 8,533,144 B1 | 9/2013 | Reeser et al. |
| 8,595,034 B2 | 11/2013 | Bauer et al. |
| 8,595,790 B2 | 11/2013 | Chang et al. |
| 8,596,293 B2 | 12/2013 | Mous et al. |
| 8,605,209 B2 | 12/2013 | Becker |
| 8,620,841 B1 | 12/2013 | Filson et al. |
| 8,621,097 B2 | 12/2013 | Venkatakrishnan et al. |
| 8,650,048 B1 | 2/2014 | Hopkins, III et al. |
| 8,694,501 B1 | 4/2014 | Trandal et al. |
| 8,712,893 B1 | 4/2014 | Brandmaier et al. |
| 8,719,134 B1 | 5/2014 | Huls et al. |
| 8,730,039 B1 | 5/2014 | Billman |
| 8,731,975 B2 | 5/2014 | English et al. |
| 8,749,381 B1 | 6/2014 | Maroney et al. |
| 8,786,425 B1 | 7/2014 | Hutz |
| 8,798,289 B1 | 8/2014 | Every et al. |
| 9,009,783 B2 | 4/2015 | Bartholomay et al. |
| 9,049,168 B2 | 6/2015 | Jacob et al. |
| 9,257,023 B2 | 2/2016 | Lee et al. |
| 9,280,252 B1 | 3/2016 | Brandmaier et al. |
| 9,297,150 B2 | 3/2016 | Klicpera |
| 9,368,009 B2 | 6/2016 | Lee et al. |
| 9,424,606 B2 | 8/2016 | Wilson, II et al. |
| 9,429,925 B2 | 8/2016 | Wait |
| 9,652,976 B2 | 5/2017 | Bruck et al. |
| 9,654,434 B2 | 5/2017 | Sone et al. |
| 9,665,892 B1 | 5/2017 | Reeser et al. |
| 9,666,060 B2 | 5/2017 | Reeser et al. |
| 9,710,858 B1 | 7/2017 | Devereaux et al. |
| 9,721,399 B2 | 8/2017 | Ishikawa |
| 9,727,921 B2 | 8/2017 | Cook et al. |
| 9,824,397 B1 | 11/2017 | Patel et al. |
| 9,882,985 B1 | 1/2018 | Esam et al. |
| 9,892,463 B1 | 2/2018 | Hakimi-Boushehri et al. |
| 9,898,912 B1 | 2/2018 | Jordan, II et al. |
| 9,947,051 B1 | 4/2018 | Allen et al. |
| 9,947,202 B1 | 4/2018 | Moon et al. |
| 10,005,793 B2 | 6/2018 | Mazitschek et al. |
| 10,042,341 B1 | 8/2018 | Jacob |
| 10,055,793 B1 | 8/2018 | Call et al. |
| 10,102,585 B1 | 10/2018 | Bryant et al. |
| 10,169,771 B1 | 1/2019 | Devereaux et al. |
| 10,181,160 B1 | 1/2019 | Hakimi-Boushehri et al. |
| 10,249,158 B1 | 4/2019 | Jordan, II et al. |
| 10,282,787 B1 | 5/2019 | Hakimi-Boushehri et al. |
| 10,282,788 B1 | 5/2019 | Jordan, II et al. |
| 10,346,811 B1 | 7/2019 | Jordan, II et al. |
| 10,353,359 B1 | 7/2019 | Jordan, II et al. |
| 10,356,303 B1 | 7/2019 | Jordan, II et al. |
| 10,388,135 B1 | 8/2019 | Jordan, II et al. |
| 10,514,669 B1 | 12/2019 | Call et al. |
| 10,522,009 B1 | 12/2019 | Jordan, II et al. |
| 10,552,911 B1 | 2/2020 | Allen et al. |
| 10,607,295 B1 | 3/2020 | Hakimi-Boushehri et al. |

(56) References Cited

U.S. PATENT DOCUMENTS

| | | |
|---|---|---|
| 10,679,292 B1 | 6/2020 | Call et al. |
| 10,685,402 B1 | 6/2020 | Bryant et al. |
| 10,741,033 B1 | 8/2020 | Jordan, II et al. |
| 2001/0025349 A1 | 9/2001 | Sharood et al. |
| 2002/0040306 A1 | 4/2002 | Sugiyama et al. |
| 2002/0147006 A1 | 10/2002 | Coon et al. |
| 2002/0184643 A1 | 12/2002 | Fichet |
| 2003/0025599 A1 | 2/2003 | Monroe |
| 2003/0048191 A1 | 3/2003 | Denton |
| 2003/0192600 A1 | 10/2003 | Ford |
| 2003/0234725 A1 | 12/2003 | Lemelson et al. |
| 2004/0054789 A1 | 3/2004 | Breh et al. |
| 2004/0153346 A1 | 8/2004 | Grundel et al. |
| 2004/0153382 A1 | 8/2004 | Boccuzzi et al. |
| 2004/0177032 A1 | 9/2004 | Bradley et al. |
| 2004/0185844 A1 | 9/2004 | Neuman |
| 2004/0211228 A1 | 10/2004 | Nishio et al. |
| 2004/0214566 A1 | 10/2004 | Suzuki et al. |
| 2005/0030175 A1 | 2/2005 | Wolfe |
| 2005/0080520 A1 | 4/2005 | Kline et al. |
| 2005/0111696 A1 | 5/2005 | Baer |
| 2005/0139420 A1 | 6/2005 | Spoltore et al. |
| 2005/0143956 A1 | 6/2005 | Long et al. |
| 2005/0241003 A1 | 10/2005 | Sweeney et al. |
| 2005/0251427 A1 | 11/2005 | Dorai et al. |
| 2005/0275527 A1 | 12/2005 | Kates |
| 2006/0033625 A1 | 2/2006 | Johnson et al. |
| 2006/0058612 A1 | 3/2006 | Dave et al. |
| 2006/0100912 A1 | 5/2006 | Kumar et al. |
| 2006/0154642 A1 | 7/2006 | Scannell |
| 2006/0158339 A1 | 7/2006 | Brundula |
| 2006/0184379 A1 | 8/2006 | Tan et al. |
| 2007/0001904 A1 | 1/2007 | Mendelson |
| 2007/0096938 A1 | 5/2007 | Lopez et al. |
| 2007/0262857 A1 | 11/2007 | Jackson |
| 2007/0276626 A1 | 11/2007 | Bruffey |
| 2007/0289635 A1 | 12/2007 | Ghazarian et al. |
| 2008/0018474 A1 | 1/2008 | Bergman et al. |
| 2008/0019392 A1 | 1/2008 | Lee |
| 2008/0056722 A1 | 3/2008 | Hendrix et al. |
| 2008/0059351 A1 | 3/2008 | Richey et al. |
| 2008/0065427 A1 | 3/2008 | Helitzer et al. |
| 2008/0101160 A1 | 5/2008 | Besson |
| 2008/0184272 A1 | 7/2008 | Brownewell |
| 2008/0285797 A1 | 11/2008 | Hammadou |
| 2008/0301216 A1 | 12/2008 | Han |
| 2009/0001891 A1 | 1/2009 | Patterson |
| 2009/0024420 A1 | 1/2009 | Winkler |
| 2009/0044595 A1 | 2/2009 | Vokey |
| 2009/0094129 A1 | 4/2009 | Rhodes et al. |
| 2009/0174364 A1 | 7/2009 | Onishi et al. |
| 2009/0195349 A1 | 8/2009 | Frader-Thompson et al. |
| 2009/0243852 A1 | 10/2009 | Haupt et al. |
| 2009/0259581 A1 | 10/2009 | Horowitz et al. |
| 2009/0265193 A1 | 10/2009 | Collins et al. |
| 2010/0025349 A1 | 2/2010 | Khoshnevis |
| 2010/0073840 A1 | 3/2010 | Hennessey, Jr. |
| 2010/0131416 A1 | 5/2010 | Means |
| 2010/0188023 A1 | 7/2010 | Anderson et al. |
| 2010/0188206 A1 | 7/2010 | Kates |
| 2010/0235285 A1 | 9/2010 | Hoffberg |
| 2010/0241465 A1 | 9/2010 | Amigo et al. |
| 2010/0289643 A1 | 11/2010 | Trundle et al. |
| 2010/0299217 A1 | 11/2010 | Hui |
| 2011/0003577 A1 | 1/2011 | Rogalski et al. |
| 2011/0029145 A1 | 2/2011 | Dong |
| 2011/0040785 A1 | 2/2011 | Steenberg et al. |
| 2011/0077875 A1 | 3/2011 | Tran et al. |
| 2011/0112660 A1 | 5/2011 | Bergmann et al. |
| 2011/0136463 A1 | 6/2011 | Ebdon et al. |
| 2011/0161117 A1 | 6/2011 | Busque et al. |
| 2011/0161119 A1 | 6/2011 | Collins |
| 2011/0166714 A1 | 7/2011 | Stachnik |
| 2011/0195687 A1 | 8/2011 | Das et al. |
| 2011/0203383 A1 | 8/2011 | Phelps |
| 2011/0251807 A1 | 10/2011 | Rada et al. |
| 2011/0270453 A1 | 11/2011 | Kalogridis et al. |
| 2012/0016695 A1 | 1/2012 | Bernard et al. |
| 2012/0046973 A1 | 2/2012 | Eshleman et al. |
| 2012/0079092 A1 | 3/2012 | Woxblom et al. |
| 2012/0101855 A1 | 4/2012 | Collins et al. |
| 2012/0116071 A1 | 5/2012 | Rao et al. |
| 2012/0116820 A1 | 5/2012 | English et al. |
| 2012/0166115 A1 | 6/2012 | Apostolakis |
| 2012/0188081 A1 | 7/2012 | Van Katwijk |
| 2012/0191498 A1 | 7/2012 | Singh et al. |
| 2012/0232935 A1 | 9/2012 | Voccola |
| 2012/0249121 A1 | 10/2012 | Pamulaparthy et al. |
| 2012/0265586 A1 | 10/2012 | Mammone |
| 2012/0290333 A1 | 11/2012 | Birchall |
| 2012/0290497 A1 | 11/2012 | Magara et al. |
| 2012/0296580 A1 | 11/2012 | Barkay |
| 2012/0311620 A1 | 12/2012 | Conklin et al. |
| 2013/0022234 A1* | 1/2013 | U S ............... G06T 7/20 382/103 |
| 2013/0049950 A1 | 2/2013 | Wohlert |
| 2013/0073321 A1 | 3/2013 | Hofmann et al. |
| 2013/0085688 A1 | 4/2013 | Miller et al. |
| 2013/0096960 A1 | 4/2013 | English et al. |
| 2013/0107706 A1 | 5/2013 | Raleigh |
| 2013/0120137 A1 | 5/2013 | Lehmann |
| 2013/0144486 A1 | 6/2013 | Ricci |
| 2013/0145693 A1 | 6/2013 | Li |
| 2013/0159021 A1 | 6/2013 | Felsher |
| 2013/0166325 A1 | 6/2013 | Ganapathy et al. |
| 2013/0169817 A1 | 7/2013 | Jones et al. |
| 2013/0226624 A1 | 8/2013 | Blessman et al. |
| 2013/0234840 A1 | 9/2013 | Trundle et al. |
| 2013/0257626 A1 | 10/2013 | Masli et al. |
| 2013/0263611 A1 | 10/2013 | Kearney et al. |
| 2013/0290013 A1 | 10/2013 | Forrester |
| 2013/0290033 A1 | 10/2013 | Reeser et al. |
| 2014/0032433 A1 | 1/2014 | Eick et al. |
| 2014/0122133 A1 | 5/2014 | Weisberg et al. |
| 2014/0136242 A1 | 5/2014 | Weekes et al. |
| 2014/0149127 A1 | 5/2014 | Storti |
| 2014/0180723 A1 | 6/2014 | Cote et al. |
| 2014/0201315 A1 | 7/2014 | Jacob et al. |
| 2014/0201844 A1 | 7/2014 | Buck |
| 2014/0216071 A1 | 8/2014 | Broadbent |
| 2014/0222329 A1 | 8/2014 | Frey |
| 2014/0222469 A1 | 8/2014 | Stahl et al. |
| 2014/0229205 A1 | 8/2014 | Gibson |
| 2014/0238511 A1 | 8/2014 | Klicpera |
| 2014/0244997 A1 | 8/2014 | Goel et al. |
| 2014/0257862 A1 | 9/2014 | Billman et al. |
| 2014/0257871 A1 | 9/2014 | Christensen et al. |
| 2014/0257876 A1 | 9/2014 | English et al. |
| 2014/0266717 A1 | 9/2014 | Warren et al. |
| 2014/0278571 A1 | 9/2014 | Mullen et al. |
| 2014/0303801 A1 | 10/2014 | Ahn et al. |
| 2014/0310162 A1 | 10/2014 | Collins |
| 2014/0313044 A1 | 10/2014 | Thompson et al. |
| 2014/0317741 A1 | 10/2014 | Be'ery et al. |
| 2014/0318200 A1 | 10/2014 | Ellis et al. |
| 2014/0320295 A1 | 10/2014 | Kates |
| 2014/0340216 A1 | 11/2014 | Puskarich |
| 2014/0358592 A1 | 12/2014 | Wedig et al. |
| 2014/0379156 A1 | 12/2014 | Kamel et al. |
| 2015/0020299 A1 | 1/2015 | Hsu |
| 2015/0032480 A1 | 1/2015 | Blackhurst et al. |
| 2015/0061859 A1 | 3/2015 | Matsuoka et al. |
| 2015/0116107 A1 | 4/2015 | Fadell et al. |
| 2015/0116112 A1 | 4/2015 | Flinsenberg et al. |
| 2015/0124087 A1 | 5/2015 | Jones, Jr. et al. |
| 2015/0135596 A1 | 5/2015 | Cooper |
| 2015/0154712 A1 | 6/2015 | Cook |
| 2015/0160623 A1 | 6/2015 | Holley |
| 2015/0160636 A1 | 6/2015 | McCarthy et al. |
| 2015/0163412 A1 | 6/2015 | Holley et al. |
| 2015/0168976 A1 | 6/2015 | Loucks et al. |
| 2015/0170288 A1 | 6/2015 | Harton et al. |
| 2015/0206249 A1 | 7/2015 | Fini |
| 2015/0254940 A1 | 9/2015 | Graef et al. |

(56) References Cited

U.S. PATENT DOCUMENTS

| | | |
|---|---|---|
| 2015/0287310 A1 | 10/2015 | Deliuliis et al. |
| 2015/0305690 A1 | 10/2015 | Tan et al. |
| 2015/0332407 A1 | 11/2015 | Wilson, II et al. |
| 2015/0364028 A1 | 12/2015 | Child et al. |
| 2016/0005130 A1 | 1/2016 | Devereaux et al. |
| 2016/0006723 A1 | 1/2016 | Wilson |
| 2016/0018226 A1 | 1/2016 | Plocher et al. |
| 2016/0042463 A1 | 2/2016 | Gillespie |
| 2016/0078744 A1 | 3/2016 | Gieck |
| 2016/0104250 A1 | 4/2016 | Allen et al. |
| 2016/0119424 A1 | 4/2016 | Kane et al. |
| 2016/0161940 A1 | 6/2016 | Max |
| 2016/0188829 A1 | 6/2016 | Southerland et al. |
| 2016/0269882 A1 | 9/2016 | Balthasar et al. |
| 2016/0269883 A1 | 9/2016 | Eswaran |
| 2016/0323771 A1 | 11/2016 | Raleigh |
| 2016/0337829 A1 | 11/2016 | Fletcher et al. |
| 2016/0343084 A1 | 11/2016 | Blessman et al. |
| 2017/0116676 A1 | 4/2017 | Blessman et al. |
| 2017/0147722 A1 | 5/2017 | Greenwood |
| 2017/0304659 A1 | 10/2017 | Chen et al. |
| 2018/0000346 A1 | 1/2018 | Cronin |
| 2018/0160988 A1 | 6/2018 | Miller et al. |

\* cited by examiner

SYSTEMS AND METHODS FOR ANALYZING SENSOR DATA TO DETECT PROPERTY INTRUSION EVENTS

CROSS-REFERENCE TO RELATED APPLICATIONS

This application is continuation of, and claims the benefit of, U.S. patent application Ser. No. 16/445,399, filed Jun. 19, 2019 and entitled "Systems and Methods for Analyzing Sensor Data to Detect Property Intrusion Events," which is a continuation of, and claims the benefit of, U.S. patent application Ser. No. 14/873,823, filed Oct. 2, 2015 and entitled "Systems and Methods for Analyzing Sensor Data to Detect Property Intrusion Events," which claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to managing a connected property. More particularly, the present disclosure relates to assessing data from smart devices to identify property intrusion events, and facilitating actions to mitigate the property intrusion events.

BACKGROUND

With the proliferation of the "internet of things," more household devices and items are gaining communication and network connectivity capabilities. The new capabilities are enabling easier data detection and more accurate information and metrics. However, the ability to detect certain conditions associated with devices and items may be limited. Additionally, the channels to control and maintain devices and items as a response to certain conditions may also be limited.

BRIEF SUMMARY

The present embodiments may, inter alia, access certain device data to detect certain conditions within a property, and determine actions or commands to perform to address the conditions. Further, the present embodiments may effectively and efficiently communicate relevant information associated with the conditions and enable users to facilitate the actions or commands. One particular functionality relates to analyzing device data to detect property intrusion events, and then performing actions to mitigate the property intrusion events and/or notifying individuals of the property intrusion events.

Generally, the present embodiments may relate to (1) home control and/or automation, as well as (2) loss prevention, reduction, and/or mitigation through proactively identifying attempted property intrusion events, notifying an individual of property intrusion events, and/or facilitating commands or actions to mitigate the property intrusion events. The foregoing functionality may also be used by an insurance provider to generate, update, or adjust insurance policies, premiums, rates, discounts, points, and/or rewards, and/or make recommendations to an insured individual.

According to one embodiment, a computer-implemented method of detecting property intrusion within a property may be provided. The property may be populated with a hardware controller in communication with a plurality of sensors disposed within the property. The computer-implemented method may include (1) receiving, by the hardware controller, sensor data from at least one sensor of the plurality of sensors, and/or (2) accessing baseline sensor data corresponding to a set of default intrusion attempts. The computer-implemented method may further include (3) comparing, by one or more processors, the received sensor data to the baseline sensor data including: determining a level of similarity between the received sensor data and the baseline sensor data, and/or determining that the level of similarity meets a threshold value. Additionally, the computer-implemented method may include (4) responsive to the comparing, generating a notification that indicates a property intrusion event indicated in the received sensor data, and/or (5) communicating the notification to an electronic device of an individual associated with the property to facilitate remotely issuing commands or otherwise mitigating damage associated with, or caused by, the property intrusion event. The method may include additional, less, or alternate actions, including those discussed elsewhere herein.

According to another embodiment, a hardware controller for detecting property intrusion within a property may be provided. The hardware controller may be in communication with a set of devices populated within the property. The hardware controller may include a communication module adapted to interface with the set of devices populated within the property, a memory adapted to store non-transitory computer executable instructions, and/or a processor adapted to interface with the communication module. The processor may configured to execute the non-transitory computer executable instructions to cause the processor to receive, via the communication module, sensor data from at least one device of the set of devices, and/or access baseline sensor data corresponding to a set of default intrusion attempts. The processor may further be configured to compare the received sensor data to the baseline sensor data including: determine a level of similarity between the received sensor data and the baseline sensor data, and/or determine that the level of similarity meets a threshold value. Additionally, the processor may be configured to, responsive to the comparing, generate a notification that indicates a property intrusion event indicated in the received sensor data, and transmit, via the communication module, the notification to an electronic device of an individual associated with the property. The electronic device may allow the individual to select various commands to facilitate mitigation of damage caused by the property intrusion event. The hardware controller and/or processor may be configured to include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
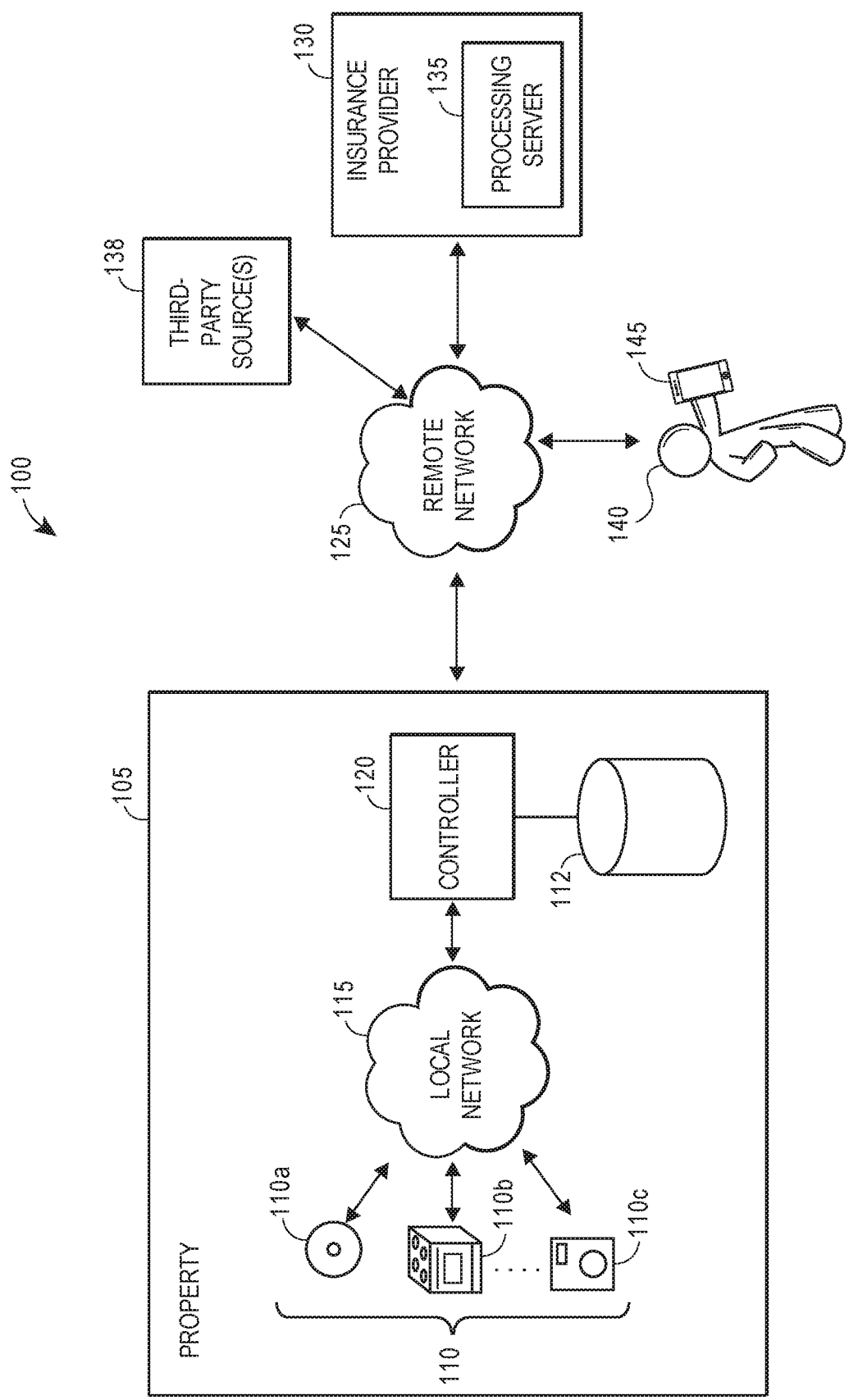
FIG. 1 depicts an exemplary environment including components and entities associated with managing device operation and facilitating insurance policy processing, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, assessing and managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider or other entity, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or insurance provider remote processor(s), may collect or retrieve various data from the devices or personal property, analyze the data, and/or identify various actions to facilitate based upon the analysis. In particular, the central controller and/or insurance provider remote processor(s) may receive operation data from the smart devices, where the operation data may include various sensor data associated with the smart devices. The central controller and/or insurance provider remote processor(s) may compare the operation data to baseline sensor data, where the baseline sensor data may correspond to "default" property intrusion attempts or otherwise sensor data that may be consistent with one or more different types of property intrusion attempts. The comparison may indicate a level of similarity between the received sensor data and the baseline sensor data.

Based upon the comparison, the central controller and/or insurance provider remote processor(s) may determine that the property may be experiencing a property intrusion, identify a command or action to perform to mitigate the property intrusion, and/or facilitate performance of the command or action. The central controller and/or insurance provider remote processor(s) may communicate with a user device (or mobile device) of an individual associated with the property (e.g., an occupant or owner of the property) to notify the individual of the property intrusion. The individual may use the user device to select various commands or actions to take to facilitate mitigation of the property intrusion.

The systems and methods discussed herein address a challenge that is particular to property management. In particular, the challenge relates to a difficulty in identifying the occurrence of a property intrusion event associated with a property, as well as a difficulty in mitigating the property intrusion event. This is particularly apparent when the property is unoccupied. Conventional security systems may only activate when a certain condition is triggered. However, these conventional security systems may not account for many of seemingly limitless ways of gaining unlawful access to a property. In contrast, the present systems and methods leverage sensor data from connected devices to detect and identify certain types of property intrusion events, and/or dynamically identify commands or actions to facilitate to mitigate the property intrusion events. Therefore, because the systems and methods employ the collection and analysis of sensors data associated with connected devices within the property, the systems and methods are necessarily rooted in computer technology in order to overcome the noted shortcomings that specifically arise in the realm of property management.

Similarly, the systems and methods provide improvements in a technical field, namely, home automation and security. Instead of the systems and methods merely being performed by hardware components using basic functions, the systems and methods employ complex steps that go beyond the mere concept of simply retrieving and combining data using a computer. In particular, the hardware components receive data from connected devices, analyze the data in combination with baseline or default data to identify an occurrence of a property intrusion event, determine a command or action to take to mitigate the property intrusion event, facilitate performance of the command or action, and/or notify an individual of a property intrusion event. Additionally, because a central controller in a property retrieves and analyzes sensor data from a plurality of connected devices in the property, the central controller and the connected devices are part of a "thin client" environment that improves data persistence and information processing. This combination of elements further impose meaningful limits in that the operations are applied to improve home automation and security by detecting property intrusion events, and/or facilitating mitigating actions in a meaningful and effective way.

According to implementations, the systems and methods may support a dynamic, real-time or near-real-time analysis of any received data. In particular, the central controller and/or insurance provider may retrieve and/or receive real-time sensor data from the sensors, analyze the sensor data and any baseline data in real time, and dynamically assessing any property intrusion event. Additionally, the central controller and/or insurance provider may dynamically generate notifications in real-time and communicate the notifications to individuals in real-time. Accordingly, the real-time capability of the systems and methods enable individuals the assurance of real-time property monitoring.

Generally, the systems and methods offer numerous benefits to property security, as well as to individuals associated with the property. In particular, the systems and methods may automatically detect property intrusion events that the individuals may not realize are occurring, and may automatically facilitate preventative or corrective actions to address the events. As a result, security associated with the property may improve. Further, the systems and methods improve loss prevention and mitigate actual loss. As a further benefit, individuals associated with the property may be able to remotely request certain actions to be performed to mitigate the property intrusion events.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models, and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The method may also include adjusting an insurance policy, premium, or discount (such as a homeowners, renters, auto, home, health, or life insurance policy, premium, or discount) based upon the functionality discussed herein, and/or an insured having a home and/or mobile device with such functionality.

I. Exemplary Environment and Components for Assessing Device Operation and Functionalities Relating Thereto FIG. 1 depicts an exemplary environment 100 including components and entities for managing devices associated with a property and processing insurance policies associated therewith. Although FIG. 1 depicts certain entities, components, and devices, it should be appreciated that additional, fewer, or alternate entities and components are envisioned.

As illustrated in FIG. 1, the environment 100 may include a property 105 that contains a controller 120 and a plurality of devices 110 (or smart devices) that may be each connected to a local communication network 115. Each of the plurality of devices 110 may be a "smart" device that may be configured with one or more sensors capable of sensing and communicating operating data associated with the corresponding device 110. As shown in FIG. 1, the plurality of devices 110 may include a smart alarm system 110*a*, a smart stove 110*b*, and/or a smart washing machine 110*c*. Each of the plurality of devices 110 may be located within or proximate to the property 105 (generally, "on premises"). Although FIG. 1 depicts only one property 105, it should be appreciated that multiple properties are envisioned, each with its own controller and devices. Further, it should be appreciated that additional, fewer, or alternate devices may be present in the property 105.

In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For instance, a homeowner may purchase an alarm system that installs sensors on or near a door to detect when a door has been opened and/or unlocked.

In some embodiments, the plurality of devices 110 may monitor their own status or condition via the sensors to detect any issues or problems. In response to detecting issues or problems, the plurality of devices 110 may be able to indicate the issues or problems via display components, such as LED lights, display screens, or other visual indicators. In further embodiments, the controller 120 may be configured to monitor, via sensor data, whether the plurality of devices 110 and/or parts thereof have been installed correctly, whether replacement parts are new and/or otherwise in good condition, and/or other conditions associated with the plurality of devices 110 and/or parts thereof.

The plurality of devices 110 may be configured to communicate with a controller 120 via the local communication network 115. The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols, such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115 (and/or to the insurance provider 130 remote processing server 135 via the network 125), operational data gathered from sensors associated with the plurality of devices 110. The operational data may be audio data, image or video data, motion data, status data, usage amounts, and/or other data or information. For instance, the operational data may indicate that a window has been shattered; the presence of a person, fire, or water in a room; the sound made near a smart device; and/or other information pertinent to an operation state or status of the plurality of devices 110. For further instance, the operational data may include motion data that may indicate whether any individuals are within the property 105 and/or located on the exterior of the property 105 (i.e., whether the property 105 is occupied or unoccupied). Additionally, the operational data may include device usage data. The operational data may include a timestamp representing the time that the operational data was recorded.

In some cases, the plurality of devices 110 may transmit, to the controller 120 (and/or insurance provider 130 remote processing server 135), various data and information associated with the plurality of devices 110. In particular, the data and information may include location data within the property, as well as various costs and prices associated with the plurality of devices 110. For instance, a washing machine may include a component such as a data tag that stores a location of the washing machine within the property 105, a retail price of the washing machine, and/or replacement costs of various parts of (or the entirety of) the washing machine. The various data and information may be programmable and updatable by an individual or automatically by the controller 120.

The controller 120 may be coupled to a database 112 that stores various operational data and information associated with the plurality of devices 110. Although FIG. 1 depicts the database 112 as coupled to the controller 120, it is envisioned that the database 112 may be maintained in the "cloud" such that any element of the environment 100 capable of communicating over either the local network 115 or one or more other networks 125 may directly interact with the database 112.

In some embodiments, the database 112 may organize the operational data according to which individual device 110 the data may be associated and/or the room or subsection of the property in which the data was recorded. Further, the database 112 may maintain an inventory list that includes the plurality of devices 110, as well as various data and information associated with the plurality of devices 110 (e.g., locations, replacement costs, etc.).

In one embodiment, the database 112 may maintain various operation states of the plurality of devices 110. In particular, the operation states may specify various settings of the plurality of devices 110 such that when the respective device is configured at the setting(s), the respective device will operate in the corresponding operation state. For instance, an operation state for a smart thermostat may be "heat conservation" whereby the corresponding setting is 64 degrees (as opposed to a more "normal" 70 degree setting). It should be appreciated that each operation state may specify settings for more than one of the devices 110.

The controller 120 (and/or the plurality of devices 112) may be configured to communicate with other components and entities, such as an insurance provider 130 and various third party source(s) 138 via the network(s) 125. According to some embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). In some cases, both the local network 115 and the network 125(s) may utilize the same technology.

Generally, the insurance provider 130 may be any individual, group of individuals, company, corporation, or other type of entity that may issue insurance policies for customers, such as a home insurance policy associated with the property 105. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130.

Further, although the present disclosure describes the systems and methods as being facilitated in part by the insurance provider 130, it should be appreciated that other non-insurance related entities may implement the systems and methods. For instance, a general contractor may aggregate the insurance-risk data across many properties to determine which appliances or products provide the best protection against specific causes of loss, and/or deploy the appliances or products based upon where causes of loss are most likely to occur. Accordingly, it may not be necessary for the property 105 to have an associated insurance policy for the property owners to enjoy the benefits of the systems and methods.

The third-party source(s) 138 may represent any entity or component that is configured to obtain, detect, and/or determine data or information that may be relevant to the devices 110 of the property 105. In some embodiments, the third-party source(s) 138 may be a manufacturer, supplier, servicer, or retailer of the any of the devices 110, as well as for replacement devices for the devices 110. For instance, if one of the devices 110 is a refrigerator, the third-party source 138 may be refrigerator manufacturer that sells refrigerators of the same or different types or models as the refrigerator device 110. The third-party source(s) 138 may store data associated with a replacement device (e.g., cost, retail location, general information, availability, or the like). Further, the third-party source(s) 138 may store baseline data associated with various types of property intrusion attempts. The third-party source(s) 138 may be configured to communicate various data or information to the controller 120 and/or to the insurance provider 130 via the network(s) 125, whereby the controller 120 and/or the insurance provider 130 may examine the data or information to facilitate various functionalities.

The controller 120, the insurance provider 130 and/or the processing server 135, and the third-party source(s) 138 may also be in communication, via the network(s) 125, with an electronic device 145 associated with an individual 140. In some embodiments, the individual 140 may have an insurance policy (e.g., a home insurance policy) for the property 105 or a portion of the property 105, or may otherwise be associated with the property 105 (e.g., the individual 140 may live in the property 105). The electronic device 145 may be a mobile device, such as a smartphone, a desktop computer, a laptop, a tablet, a phablet, a smart watch, smart glasses, wearable electronics, pager, personal digital assistant, or any other electronic device, including computing devices configured for wireless radio frequency (RF) communication and data transmission. In some implementations, the controller 120 (and/or insurance provider 130 remote processing server 135) may communicate, to the individual 140 via the electronic device 145, an indication of the operation of the plurality of devices 110, such as the commands transmitted to the plurality of devices 110. Further, the controller 120 (and/or insurance provider 130 remote processing server 135) may enable the individual 140 to remotely control various of the plurality of devices 110 via the electronic device 145.

According to some other implementations, the controller 120 (and/or insurance provider 130 remote processing server 135) may analyze sensor data from any of the plurality of devices 110 to detect property intrusion attempts associated with the property 105. The controller 120 (and/or insurance provider 130 remote processing server 135) may generate notifications or alerts associated with the detected property intrusion attempts, and/or communicate the notifications or alerts to the electronic device 145 via the network 125. Further, the controller 120 (and/or insurance provider 130 remote processing server 135) may detect any damage to the plurality of devices 110 and/or to other portions of the property 105, and may generate a proposed insurance claim that indicates the damage and transmit, via the network 125, the proposed insurance claim related to the electronic device 145. The proposed insurance claim may contain pre-populated fields that indicate various information and data, such as causes of loss (e.g., water, wind, fire, intrusion, etc.); damaged devices; costs associated with the damaged devices; time, date, and/or location of the insurance-related event; and/or other information included in an insurance claim.

The controller 120 (and/or insurance provider 130 remote processing server 135) may also transmit any modifications to insurance policies based upon detected data from the plurality of devices 110. In response, the homeowner 140 may accept the proposed insurance claim or make modifications to the proposed insurance claim, and/or otherwise accept/reject any modifications to the insurance policy. The electronic device may transmit, via the network 125, the accepted or modified insurance claim back to the controller 120 (and/or insurance provider 130 remote processing server 135).

The controller 120 may facilitate any processing of the insurance claim with the processing server 135 of the insurance provider 130. Additionally or alternatively, the processing server 135 may facilitate the proposed insurance claim communications and processing directly with the customer 140. In some implementations, the insurance provider 130 remote processing server 135 may provide the same functionality as that described herein with respect to the controller 120.

Figure 2:
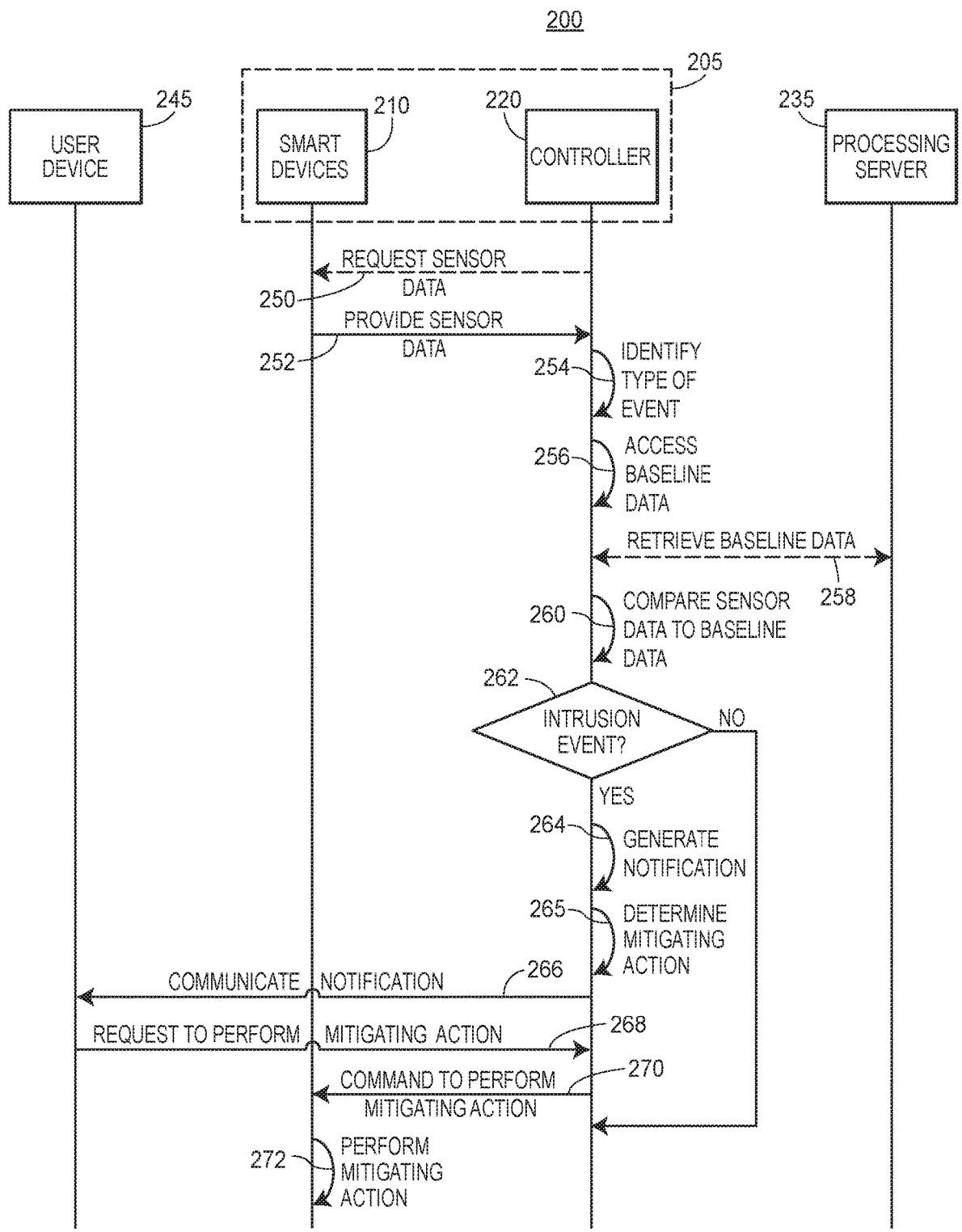
FIG. 2 is an exemplary signal diagram associated with assessing device data to identify property intrusion events and facilitating various actions to mitigate the property intrusion events, in accordance with some embodiments.

II. Exemplary Communication Flow for Assessing Device Sensor Data and Facilitating Corrective/Preventative Actions Referring to FIG. 2, illustrated is an exemplary signal diagram 200 associated with collecting smart device data and facilitating various functionalities relating thereto. FIG. 2 may include a set of smart devices 210 (such as the smart devices 110 (or one of the plurality of devices) as discussed with respect to FIG. 1), a controller 220 (such as the controller 120 as discussed with respect to FIG. 1), a processing server 235 (such as the processing server 135 as discussed with respect to FIG. 1), and/or a user device 245 (such as the user device 145 as discussed with respect to FIG. 1).

The smart devices 210 and the controller 220 may be located within a property 205 (such as the property 105 as discussed with respect to FIG. 1). According to some embodiments, the user device 245 may belong to an individual associated with the property 205, such as a resident of the property 205 and/or an individual having an insurance policy for the property 205.

The signal diagram 200 may begin when the controller 220 optionally requests (250) the smart devices 210 for sensor data. In some implementations, the controller 220 may periodically request the smart devices 210 for sensor data, or the controller 220 may request the smart devices 210 for sensor data in response to various triggers (e.g., at a certain time of the day or in response to receiving particular sensor data from a particular smart device 210). The controller 220 may also request sensor data from one or more specific smart devices 210. The smart device(s) 210 may provide (252) sensor data to the controller 220. For example, the sensor data may be audio data, imaging data (e.g., images and/or videos), and/or motion/movement sensor data. It should be appreciated that other types of sensor data and combinations of sensor data are envisioned. The smart device(s) 210 may provide the sensor data automatically as the data is detected, in response to receiving a request from the controller 220, or in response to various triggers (e.g., detected motion data at 3:00 AM).

The controller 220 may analyze the sensor data to identify (254) an event or occurrence and a type of event/occurrence that is indicated in the sensor data. In particular, the event may be an intrusion attempt by an individual or group of individuals, and the type of event may correspond to how the intrusion is being attempted or performed. For example, the individual(s) may attempt to break down/enter through a door or break/enter through a window, or may survey the property for a point of entry. It should be appreciated that other types of intrusion attempts are envisioned, and the sensor data may indicate the attempt at different progress points (e.g., initial surveying or completed entry). In some implementations, the controller 220 may account for a status or condition of the property (e.g., occupied or unoccupied) when the sensor data is detected/received. Accordingly, the controller 220 may analyze various combinations of sensor data from various combinations of the smart devices 210 to identify the event and the type of event.

The controller 220 may access (256) baseline data that corresponds to the type of event indicated in the sensor data. The controller 220 may locally store the baseline data in memory. The baseline data may indicate various "default" intrusion attempts, which may include sensor data associated with actual intrusion attempts, or generated data associated with staged/simulated intrusion attempts. For example, if the sensor data is audio data that corresponds to a front door being broken down, the controller 220 may access baseline data associated with an actual instance of door being broken down or staged/simulated audio data that simulates a door being broken down. For further example, if the sensor data is motion sensor data that corresponds to surveying for an entry point, the controller 220 may access general baseline motion sensor data consistent with surveying of a property for an entry point (which may be data of an actual surveying of a property, or data that is generated to mimic or enact a surveying of a property). In an optional implementation, such as if the controller 220 does not locally store the baseline data, the controller 220 may retrieve (258) the baseline data from the processing server 235.

The controller 220 may compare (260) the received sensor data to the baseline data. In some implementations, the controller 220 may determine a level of similarity between the received sensor data and the baseline data. In comparing the received sensor data to the baseline data, the controller 220 may compare a relevant portion of the received sensor data to a relevant portion of the baseline data. For example, if the received sensor data is audio data, the controller 220 may compare a portion of the audio data that corresponds to a window breaking to baseline data of a window breaking. In determining the level of similarity, the controller 220 may calculate a similarity percentage (e.g., 75% similar) or other parameter that may indicate similarity using various calculations, algorithms, data models, techniques, and/or the like.

The controller 220 may also determine (262) if an intrusion event is being attempted or performed based upon the comparison. In one implementation, if the level of similarity between the received sensor data and the baseline data meets or exceeds a threshold value, then the controller 220 may deem that there is an intrusion event being attempted or performed. Similarly, if the level of similarity between the received sensor data and the baseline data does not meet or exceed a threshold value, then the controller 220 may deem that there is not an intrusion event being attempted or performed. For example, if the received sensor data is audio data that indicates one loud "thud" sound, and the baseline data indicates that multiple "thud" sounds are consistent with an intrusion attempt, then the controller 220 may deem that the received sensor data (one "thud" sound) is not consistent with an intrusion attempt.

It should be appreciated that the threshold value may be a percentage on a scale from 0% to 100%, or other numeric parameter on a scale, and/or may be a default value or manually set by a user or administrator (such as the individual associated with the property). Generally, the lower (or higher) the threshold, the more (or less) "sensitive" the intrusion detection. Accordingly, the lower (or higher) the threshold, the greater (or lesser) chance there is of the controller 220 detecting a "false alarm." It should be appreciated that the controller 220 may use various techniques, calculations, algorithms, models, and the like to analyze the received sensor data and compare the received sensor data to the baseline data.

If the controller 220 determines that there is not an intrusion event (i.e., the level of similarity does not meet or exceed the threshold; "NO"), then processing may end or proceed to any other functionality. In contrast, if the controller 220 determines that there is an intrusion event (i.e., the level of similarity does meet or exceed the threshold; "YES"), then the controller 220 may generate (264) a notification that indicates the intrusion event and that may include any information related to the intrusion event. In particular, the notification may include the type of intrusion event (e.g., an alarm disarmament, breaking/entering through a window), a time of the detected intrusion event, current sensor data indicating the intrusion event, and/or any other information that is relevant to the intrusion event.

The controller 220 may also determine (265) a mitigating action or command to perform to mitigate the intrusion event. In particular, the controller 220 may make the determination based upon the type of intrusion event and/or the sensor data associated therewith. The controller 220 may also identify an appropriate smart device 210 that may be used to perform or facilitate the mitigating action. For example, if the controller 220 determines that an intrusion is being attempted via the garage of the property 205, the controller 220 may determine that the mitigating action is to turn on all of the lights within the garage, whereby the lights within the garage are the identified smart devices 210. For further example, if the controller 220 determines that a window has been broken, the controller 220 may determine to activate the alarm and notify the proper law enforcement.

The controller 220 may communicate (266) the notification generated in (264) to the user device 245. In some implementations, the notification may include a selectable option that enables the user of the user device 245 to facilitate an action within the property 205, such as the mitigating action determined in (265). The action may be any action that is controller 220 is capable of facilitating, and it may be associated with operation of one or more of the smart devices 210. Further, the action may be associated with the detected intrusion event. For example, if the intrusion event is an input of an incorrect door lock code, then the option may enable the user to select to activate the alarm. Accordingly, the user may select the option and the user device 245 may send (268) a request to the controller 220 to facilitate the mitigating action with an appropriate smart device 210. In some implementations, the user device 245 may perform the mitigating action without interfacing with the controller 220, such as notifying law enforcement of the identified intrusion attempt.

After determining the mitigating action and/or receiving the request to perform the mitigating action, the controller 220 may send (270) a command to perform a mitigating action to the appropriate smart device 210. After receipt of the command, the appropriate smart device 210 may perform (272) the mitigating action in an attempt to stop or slow the intrusion attempt, or otherwise mitigate any effect of the intrusion attempt. It should be appreciated that the controller 220 may automatically send the command to perform the mitigating action and/or may send the command to perform the mitigating action in response to receiving the request from the user device 245.

Although not depicted in FIG. 2, it should be appreciated that the controller 220, the user device 245, and/or the processing server 235 may perform any insurance processing that may result from the detected or analyzed sensor data. In particular, the sensor data may indicate damage to the property 205 itself or damage to any of the smart devices 210, which may necessitate an insurance claim associated with an insurance policy for the property 205. Accordingly, the controller 220 may provide any relevant data to the processing server 235, which may process a proposed insurance claim and communicate the proposed insurance claim directly to the user device 245. In this regard, the customer may use the user device 245 to request any insurance processing that may result from any detected data or events associated with the property 205.

Although FIG. 2 depicts the controller 220 performing various steps and determinations, it should be appreciated that the processing server 235 may perform the same or similar steps or determinations. For example, the processing server 235 may receive the sensor data, compare the sensor data to baseline data, generate a notification, communicate a notification, determine a mitigating action, and/or facilitate the mitigating action.

Figure 3:
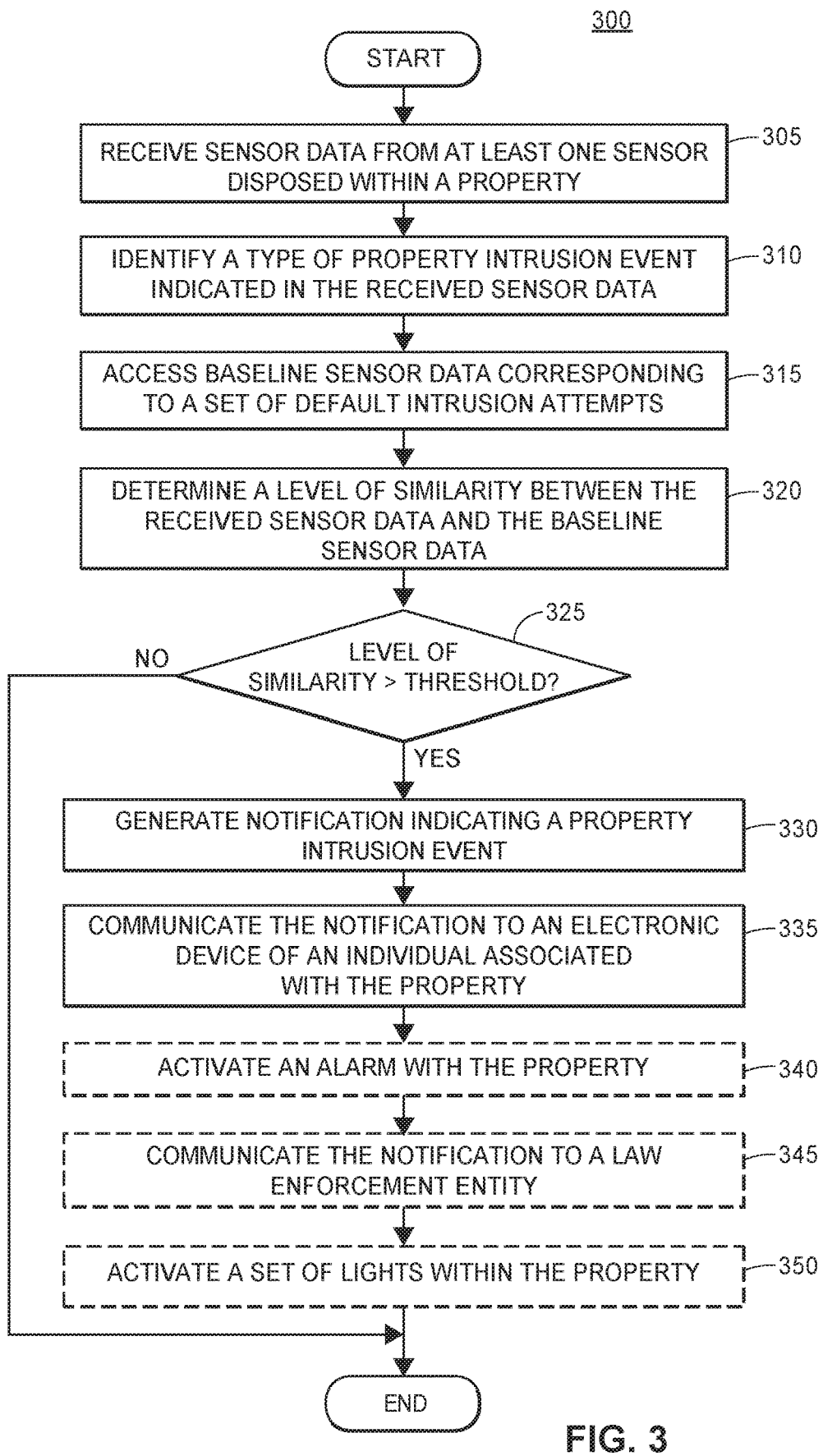
FIG. 3 is a flow diagram of an exemplary computer-implemented method of assessing device data to identify property intrusion events and facilitating various actions to mitigate the property intrusion events, in accordance with some embodiments.

III. Exemplary Method for Detecting Intrusion Events and Facilitating Mitigating Actions Referring to FIG. 3, depicted is a block diagram of an exemplary computer-implemented method 300 of processing sensor data to detect an attempted property intrusion within a property. The method 300 may be facilitated by an electronic device within the property, such as the controller 120 as discussed with respect to FIG. 1, that may be in direct or indirect communication with an insurance provider (such as the insurance provider 130 as discussed with respect to FIG. 1 or a remote processor or server thereof).

The method 300 may begin when the controller receives (block 305) sensor data from at least one sensor disposed within the property. In some embodiments, the sensor may include any type of audio sensor (e.g., a microphone), imaging sensor (e.g., digital camera, video camera, etc.), motion sensor, or any other sensor referenced herein. At block 310, the controller may examine the received sensor data to identify a type of property intrusion event included in the received sensor data. In some implementations, there may be different types of intrusion events that may have different types of associated sensor data.

For example, an intruder's attempt to break into a house may be detected using audio data that indicates broken glass or a loud banging against a door. For a further example, another attempt to break into a house may be detected using motion sense data during a specific time period, such as in the middle of the night.

After the controller identifies the type of intrusion event, the controller may access (block 315) baseline sensor data corresponding to a set of default intrusion attempts. In particular, the controller may access baseline sensor data that corresponds to the type of intrusion event identified in block 310. For example, if the sensor data includes audio data indicating a potential intrusion attempt, the controller may access baseline audio data including sample audio of actual or simulated intrusion attempts of various types. The controller may determine (block 320) a level of similarity between the received sensor data and the baseline sensor data. It should be appreciated that the controller may use any type of technique, calculation, data model, or algorithm to determine the level of similarity. In some implementations, the level of similarly may include a quantitative indicator, for example a number from 1-100, with the greater the number indicating the greater similarity between the received sensor data and the baseline sensor data.

The controller may determine (block 325) whether the level of similarity meets or exceeds a threshold value. It should be appreciated that different threshold values are envisioned. For example, if the level of similarity determined in block 315 is quantified as 90 and the threshold value is 85, then the level of similarity exceeds the threshold value. If the level of similarity does not exceed the threshold value ("NO"), processing may end or proceed to other functionality. If the level of similarity does exceed the threshold value ("YES"), then the controller may generate (block 330) a notification that indicates the property intrusion event. In some implementations, the notification may include various information associated with the property intrusion event, such as an area of the property corresponding to the property intrusion event, as well as other information such as a timestamp, the type of sensor data detected, and/or other information. In some implementations, the controller may identify an action to perform to mitigate the property intrusion event.

The controller may communicate (block 335) the notification to an electronic device of an individual associated with the property, such as via an external network and/or wireless communication and data transmission. In some implementations, the controller may store an identification of the electronic device. For example, the electronic device may be a smartphone or other mobile device belonging to the owner and/or occupant of the property. In some scenarios, the controller may communicate the notification to the insurance provider. The notification may enable the individual to request that an action to mitigate the property intrusion attempt be performed.

In some optional implementations, the controller may facilitate performing the identified action to mitigate the property intrusion event. In particular, the controller may activate (block 340) an alarm within the property. The alarm may alert any occupants of the property of the intrusion event. The controller may also optionally communicate (block 345) the notification to a law enforcement entity, such as a police station, or to a security service. Further, the controller may optionally activate (block 350) a set of lights within the property. In some implementations, the set of lights may be specific to an area of the property where the intrusion event is detected. It should be appreciated that the controller may identify and/or perform other actions to mitigate any detected property intrusion event.

IV. Exemplary Controller

Figure 4:
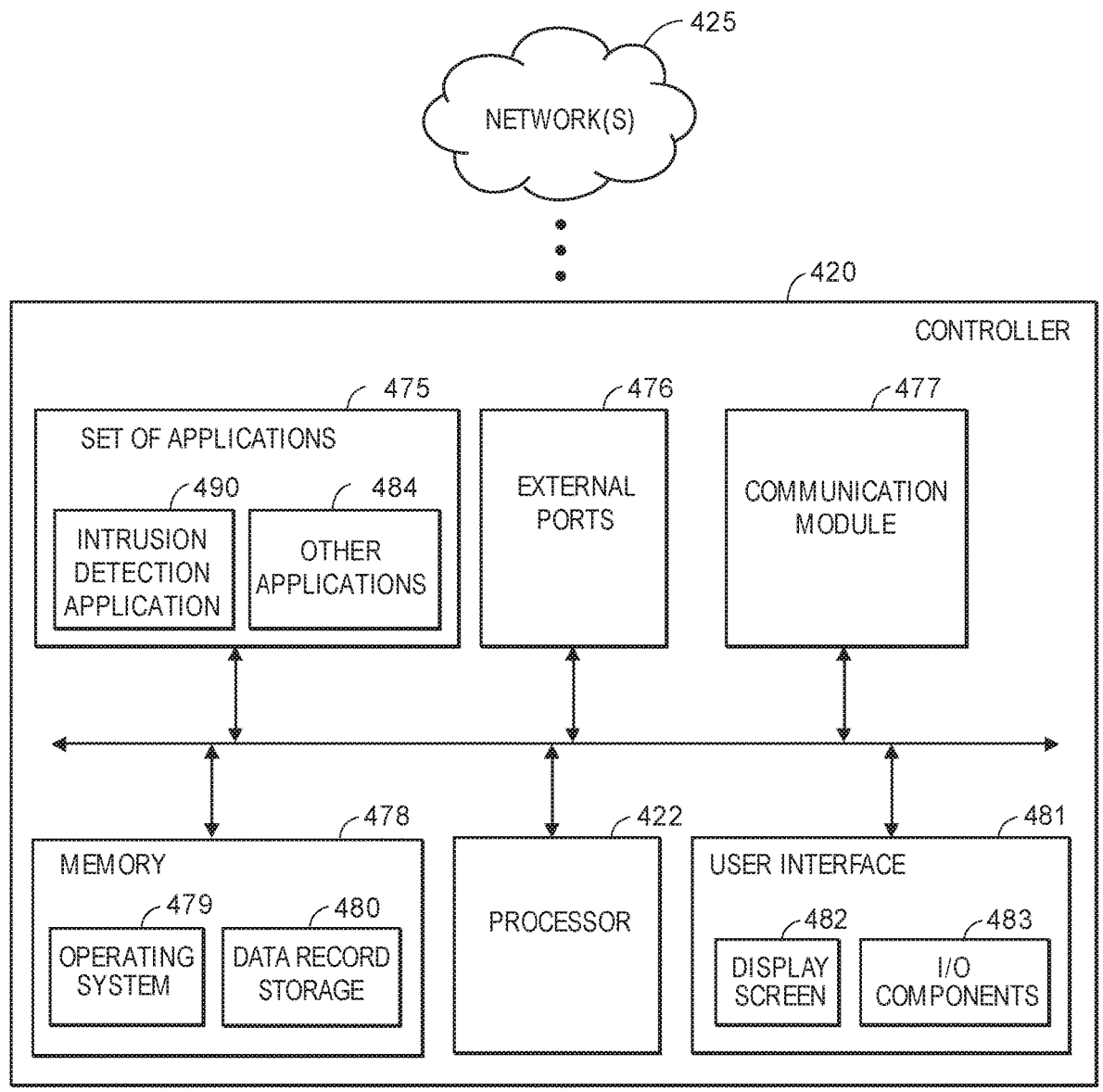
FIG. 4 is a block diagram of an exemplary controller in accordance with some embodiments.

FIG. 4 illustrates a diagram of an exemplary controller 420 (such as the controller 120 discussed with respect to FIG. 1) in which the functionalities as discussed herein may be implemented. It should be appreciated that the controller 420 may be associated with a property, as discussed herein.

The controller 420 may include a processor 422, as well as a memory 478. The memory 478 may store an operating system 479 capable of facilitating the functionalities as discussed herein, as well as a set of applications 475 (i.e., machine readable instructions). For instance, one of the set of applications 475 may be an intrusion detection application 484 configured to analyze sensor data, detect property intrusion events, and facilitate actions to mitigate the property intrusion events. The set of applications 475 may also include one or more other applications 484, such as an insurance processing application.

The processor 422 may interface with the memory 478 to execute the operating system 479 and the set of applications 475. According to some embodiments, the memory 478 may also include a data record storage 480 that stores various data, such as baseline data corresponding to a set of default intrusion attempts. The intrusion detection application 484 may interface with the data record storage 480 to retrieve relevant baseline data that the intrusion detection application 484 may use to identify property intrusion events. The memory 478 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 420 may further include a communication module 477 configured to communicate data via one or more networks 425. According to some embodiments, the communication module 477 may include one or more transceivers (e.g., WWAN, WLAN, and/or WPAN transceivers) functioning in accordance with IEEE standards, 3GPP standards, or other standards, and/or configured to receive and transmit data via one or more external ports 476. Further, the communication module 477 may include a short-range network component (e.g., an RFID reader) configured for short-range network communications. For instance, the communication module 477 may receive, via the network 425, sensor data from a plurality of devices populated within a property.

The controller 420 may further include a user interface 481 configured to present information to a user and/or receive inputs from the user. As shown in FIG. 4, the user interface 481 may include a display screen 482 and I/O components 483 (e.g., ports, capacitive or resistive touch sensitive input panels, keys, buttons, lights, LEDs, speakers, microphones). According to some embodiments, the user may access the controller 420 via the user interface 481 to assess sensor data, process insurance policies, and/or perform other functions. The controller 420 may be configured to perform insurance-related functions, such as generating proposed insurance claims and facilitating insurance claim processing. In some embodiments, the controller 420 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 422 (e.g., working in connection with the operating system 479) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

V. Exemplary Server

Figure 5:
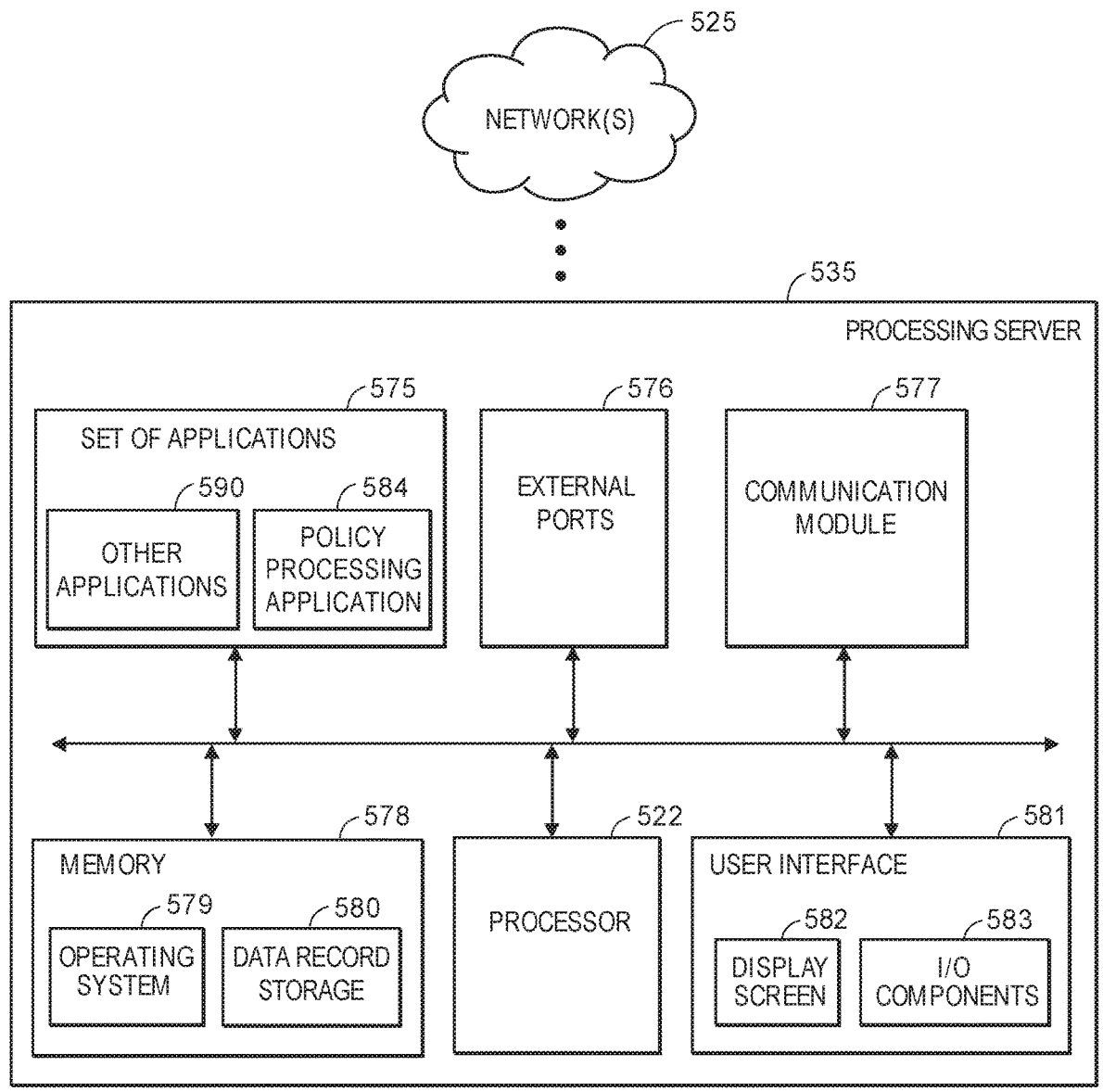
FIG. 5 is a block diagram of an exemplary processing server in accordance with some embodiments.

FIG. 5 illustrates a diagram of an exemplary processing server 535 (such as the processing server 135 discussed with respect to FIG. 1) in which the functionalities as discussed herein may be implemented. It should be appreciated that the processing server 535 may be associated with an insurance provider, as discussed herein. In one embodiment, the processing server may be configured with the same functionality as that of the controllers 120, 220 of FIGS. 1 and 2, respectively.

The processing server 535 may include a processor 522, as well as a memory 578. The memory 578 may store an operating system 579 capable of facilitating the functionalities as discussed herein, as well as a set of applications 575 (i.e., machine readable instructions). For instance, one of the set of applications 575 may be a policy processing application 584 configured to manage customer insurance policies. It should be appreciated that other applications 590 are envisioned, such as an intrusion detection application configured to assess sensor data and identify property intrusion events, and/or respond to those events identified.

The processor 522 may interface with the memory 578 to execute the operating system 579 and the set of applications 575. According to some embodiments, the memory 578 may also include a data record storage 580 that stores various information associated with customer insurance policies as well as baseline data corresponding to a set of default intrusion attempts. The policy processing application 584 may interface with the data record storage 580 to retrieve relevant information that the policy processing application 584 may use to manage insurance policies, generate notifications, and/or perform other functionalities, such as identify property intrusion events. Further, the device replacement application may interface with the data record storage 580 to retrieve device information. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 535 may further include a communication module 577 configured to communicate data via one or more networks 525. According to some embodiments, the communication module 577 may include one or more transceivers (e.g., WWAN, WLAN, and/or WPAN transceivers) functioning in accordance with IEEE standards, 3GPP standards, or other standards, and/or configured to receive and transmit data via one or more external ports 576. For instance, the communication module 577 may transmit, via the network 525, baseline data corresponding to a set of default intrusion attempts.

The processing server 525 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the processing server 535 via the user interface 581 to process insurance policies and/or perform other functions. In some embodiments, the processing server 535 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VI. Exemplary User Interfaces for Alerting of Property Intrusion Events

Figure 6A:
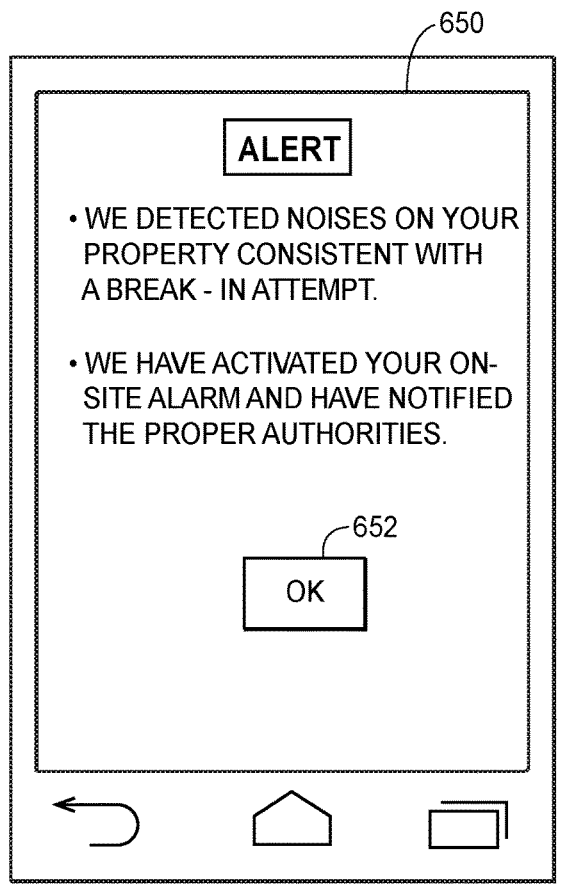
FIGS. 6A and 6B depict exemplary interfaces associated with notifying of property intrusion events and facilitating various actions to mitigate the property intrusion events, in accordance with some embodiments.
Figure 6B:
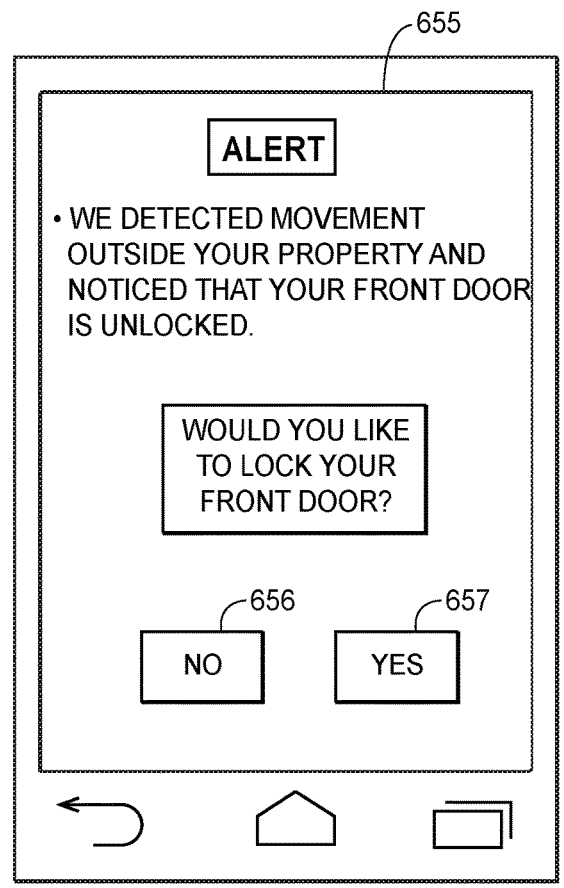

FIGS. 6A and 6B illustrate exemplary interfaces associated with example commands, displays, and actions for smart devices. An electronic device (e.g., a mobile device, such as a smartphone) may be configured to display the interfaces and/or receive selections and inputs via the interfaces. For example, a dedicated application associated with an insurance provider (or with a controller) and that is configured to operate on the electronic device may display the interfaces. It should be appreciated that the interfaces are merely examples and that alternative or additional content is envisioned.

FIG. 6A illustrates an interface 650 including details related to a detected property intrusion event. In particular, the interface 650 may include an alert that details the property intrusion attempt, namely that the controller detected noises on a property of an individual that were consistent with a break-in attempt. The interface 650 may further indicate any mitigating actions that the controller has performed in response to detecting the property intrusion event. As shown in FIG. 6A, the interface 650 indicates that the on-site alarm of the property was activated and that proper authorities (e.g., police) were notified. The interface 650 includes an "OK" selection 652 that enables the user to select to dismiss the interface 650.

FIG. 6B illustrates an additional interface 655 including details related to another detected property intrusion event. In particular, the interface 655 may include an alert that details the property intrusion attempt, namely that the controller detected movement outside a property and also that the front door to the property is unlocked. The interface 655 may further identify an action that may be performed to mitigate the property intrusion event, namely to lock the front door. The interface 655 enables the user to select whether perform the action via a "NO" selection 656 and a "YES" selection 657. If the user selects the "NO" selection 656, the electronic device may dismiss the interface 655. If the user selects the "YES" selection 657, the electronic device may transmit a request to the controller to facilitate performing the action.

VII. Exemplary Method of Detecting Property Intrusion

In one aspect, a computer-implemented method of detecting property intrusion within a property may be provided. The property may be populated with a hardware controller in communication with a plurality of sensors disposed within the property. The method may include (1) receiving, by the hardware controller, sensor data from at least one sensor of the plurality of sensors; (2) accessing baseline sensor data corresponding to a set of default intrusion attempts; (3) comparing, by one or more processors, the received sensor data to the baseline sensor data including: (i) determining a level of similarity between the received sensor data and the baseline sensor data, and (ii) determining that the level of similarity meets a threshold value; (4) responsive to the comparing, generating a notification that indicates a property intrusion event indicated in the received sensor data; and/or (5) communicating the notification to an electronic device of an individual associated with the property to facilitate mitigating damage to the property resulting from the property intrusion event and/or otherwise taking corrective action(s). The method may include additional, less, or alternate actions, including those discussed elsewhere herein.

For instance, to determine the level of similarity between the received sensor data and the baseline sensor data, the computer-implemented method may include (1) analyzing the received sensor data to identify a type of the property intrusion event indicated in the received sensor data, (2) accessing at least a portion of the baseline sensor data corresponding to the type of the property intrusion event, and/or (3) comparing the received sensor data to the at least the portion of the baseline sensor data.

In one implementation, the computer-implemented method may further include: responsive to the comparing, activating an alarm within the property. In another implementation, the computer-implemented method may further include: responsive to the comparing, communicating the notification to a law enforcement entity or security service.

In a further implementation, the computer-implemented method may further include: (1) identifying an area of the property corresponding to the received sensor data; and/or (2) responsive to the comparing, activating a set of lights or audible alarms associated with the area of the property.

In some scenarios, to receive the sensor data from the at least one sensor, the computer-implemented method may include receiving audio data from a microphone disposed within the property. In other scenarios, to receive the sensor data from the at least one sensor, the computer-implemented method may include receiving motion sensor data from a motion sensor disposed within the property. In further scenarios, to receive the sensor data from the at least one sensor, the computer-implemented method may include receiving digital image data from an image sensor disposed within the property.

To access the baseline sensor data, in some embodiments, the computer-implemented method may include: (1) analyzing the received sensor data to identify a type of the property intrusion event indicated in the received sensor data; (2) sending a request to a back-end server to access at least a portion of the baseline sensor data corresponding to the type of the property intrusion event; and/or (3) receiving, from the back-end server, the at least the portion of the baseline sensor data.

To determine the level of similarity between the received sensor data and the baseline sensor data, in some embodiments, the computer-implemented method may include: calculating a similarity percentage between the received sensor data and the baseline sensor data.

VIII. Exemplary Hardware Controller

A hardware controller for detecting property intrusion within a property may be provided. The hardware controller may be in communication with a set of devices populated within the property. The hardware controller may include a communication module adapted to interface with the set of devices populated within the property, a memory adapted to store non-transitory computer executable instructions, and/or a processor adapted to interface with the communication module. The processor may be configured to execute the non-transitory computer executable instructions to cause the processor to (1) receive, via the communication module, sensor data from at least one device of the set of devices, (2) access baseline sensor data corresponding to a set of default intrusion attempts, (3) compare the received sensor data to the baseline sensor data including: (i) determine a level of similarity between the received sensor data and the baseline sensor data, and/or (ii) determine that the level of similarity meets a threshold value, (4) responsive to the comparing, generate a notification that indicates a property intrusion event indicated in the received sensor data, and/or (5) transmit, via the communication module, the notification to an electronic device of an individual associated with the property to facilitate taking corrective actions in response to the intrusion event and/or otherwise mitigating damage caused by the intrusion event. The hardware controller and/or processor may include additional, less, or alternate functionality, including that discussed elsewhere herein.

For instance, in one scenario, to determine the level of similarity between the received sensor data and the baseline sensor data, the processor may be configured to (1) analyze the received sensor data to identify a type of the property intrusion event indicated in the received sensor data, (2) access, from the memory, at least a portion of the baseline sensor data corresponding to the type of the property intrusion event, and/or (3) compare the received sensor data to the at least the portion of the baseline sensor data.

In one implementation, the processor may be further configured to: responsive to the comparing, activate a visible, audible, or other type of alarm within the property. In another implementation, the processor may be further configured to: responsive to the comparing, transmit the notification to a law enforcement entity or security service via the communication module.

In a further implementation, the processor may be further configured to: (1) identify an area of the property corresponding to the received sensor data, and/or (2) responsive to the comparing, activate a set of lights associated with the area of the property.

In a scenario, to receive the sensor data from the at least one device, the processor may be configured to: receive, via the communication module, audio data from a microphone disposed within the property. In another scenario, to receive the sensor data from the at least one device, the processor may be configured to: receive, via the communication module, motion sensor data from a motion sensor disposed within the property. In a further scenario, to receive the sensor data from the at least one device, the processor may be configured to: receive, via the communication module, digital image data from an image sensor disposed within the property.

In one implementation, to access the baseline sensor data, the processor may be configured to: (1) analyze the received sensor data to identify a type of the property intrusion event indicated in the received sensor data, (2) send a request to a back-end server to access at least a portion of the baseline sensor data corresponding to the type of the property intrusion event, and/or (3) receive, from the back-end server, the at least the portion of the baseline sensor data.

In another implementation, to determine the level of similarity between the received sensor data and the baseline sensor data, the processor may be configured to: calculate a similarity percentage between the received sensor data and the baseline sensor data.

IX. Exemplary Detection of Intrusion Events

In some aspects, one or more of smart devices may be configured to gather audio and/or visual data that may indicate an intrusion attempt on a property. These devices may gather the audio and/or visual data and send the data to the home controller, and/or the insurance provider remote processing server, whereby the controller, and/or the insurance provider remote processing server, respectively, may analyze the data and determine whether there is a likelihood of an intrusion event.

In some embodiments, the controller, and/or the insurance provider remote processing server, may analyze the data by comparing the data to baseline data that may correspond to certain indications of an intrusion event. For instance, the baseline data may include sample audio of someone attempting to kick down a door. If the sensed audio data is similar to the sample audio, the controller, and/or the insurance provider remote processing server, may determine that someone is attempting to kick down a door to the property. The controller, and/or the insurance provider remote processing server, may generate any necessary notification(s) of the event and communicate the notification(s) to the individual, and/or take other corrective actions—sound alarms, notify police or neighbors, turn on lights, etc.

The methods of smart home control and/or automation detailed elsewhere herein may also include actions directed to home security and/or monitoring. For example, the wired or wireless communication or data transmission, and/or data, received and/or analyzed by the smart home controller or remote processor may indicate or relate to neighborhood security. Based upon the analysis by the smart home controller or remote processor of the wired or wireless communication or data transmission, and/or data received, the smart home controller or remote processor may identify suspicious behavior and/or unexpected persons in the vicinity of the insured home or a yard of the insured home (such as via facial recognition techniques).

The wired or wireless communication or data transmission, and/or data, received and/or analyzed by the smart home controller or remote processor may indicate or relate to sound. Based upon the analysis by the smart home controller or remote processor of the wired or wireless communication or data transmission, and/or data received, the smart home controller or remote processor may determine a suspicious and/or unexpected sound within, or in the vicinity of, the insured home (e.g., window breaking, door being forced open, person screaming, dog barking, etc.), and/or generate and transmit a notification or wireless communication to the insured and/or authorities of a potential home security issue.

The wired or wireless communication or data transmission, and/or data, received and/or analyzed by the smart home controller or remote processor may be generated or collected by a smart pet collar and/or a smart device located on a smart or other pet collar (e.g., dog or cat collar). The data may be generated or collected by the smart pet collar as a dog or cat (or other pet or animal) moves about the insured home or a yard of the insured home.

The wired or wireless communication or data transmission, and/or data, received and/or analyzed by the smart home controller or remote processor may be generated or collected by one or more UAVs (unmanned aerial vehicles or small drones) that fly around the exterior of and/or within the interior of the insured home. The smart home controller or remote processor may control or direct the movement or deployment of the one or more UAVs to automatically gather data about conditions of the insured home when the insured home is unoccupied or has been unoccupied for a given period of time such that damage caused by insurance-related events, or potential insurance-related events, to insured homes that have been left unoccupied for extended periods is mitigated or prevented.

The data received may be gathered or collected by smart home controllers, cameras mounted about a home, one or more mobile devices, and/or one or more automated smart devices (e.g., robots, drones) having cameras or sensors and that automatically move about an insured home.

Also, data may be collected by one or more smart devices, which may include smart sensors, smart visual or audio recording equipment, smart cameras, security systems, smart drones, smart robots, and/or smart pet collars. The mobile device may include a smart phone, laptop, tablet, phablet, netbook, notebook, smart glasses, wearable electronic device, smart watch, smart contact lenses, pager, personal digital assistant (PDA), smart pet collar, or other computing device. The smart devices or mobile device may include one or more processors and transceivers, and may be configured for wired or wireless communication (including two-way radio frequency (RF) communication), such as with a smart home controller or an insurance provider remote processor or server. The smart home controller or insurance provider remote processor or server may generate, update, or adjust an insurance policy, premium, rate, or discount based upon the insurance-related event or wired or wireless communication, data transmission, or data received, such as generating, updating, or adjusting an insurance policy covering or associated with the insured, insured home, or items within the insured home or belonging to the insured.

X. Additional Considerations

As used herein, the term "smart" may refer to devices, sensors, or appliances located within or proximate to a property, and with the ability to communicate information about the status of the device, sensor, or appliance and/or receive instructions that control the operation of the device, sensor, or appliance. In one instance, a smart thermostat may be able to remotely communicate the current temperature of the home and receive instructions to adjust the temperature to a new level. In another instance, a smart water tank may be able to remotely communicate the water level contained therein and receive instructions to restrict the flow of water leaving the tank. In contrast, "dumb" devices, sensors, or appliances located within or proximate to a property require manual control (as compared to automatic or semi-automatic or processor control associated with smart devices). Referring again to the thermostat embodiment, to adjust the temperature on a "dumb" thermostat, a person would have to manually interact with the thermostat. As such, a person is unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In some embodiments in which an appliance and a sensor external to the particular appliance are associated with each other, "smart device" may refer to both the external sensors and the appliance collectively. Some exemplary devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual is a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission. The data collected may be related to insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For instance, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of detecting property intrusion within a property, the property populated with a hardware controller in communication with a plurality of sensors disposed within the property, the method comprising:
   receiving, by the hardware controller, sensor data from at least one sensor of the plurality of sensors, wherein the sensor data (i) indicates a location of the at least one sensor within the property, and (ii) comprises motion sense data, audio data, and digital image data;
   identifying, based on the location indicated in the sensor data, an area of the property corresponding to the received sensor data;
   analyzing the motion sense data in combination with the audio data and the digital image data to determine that a combination of the motion sense data, the audio data, and the digital image data indicates a person surveying the property for a point of entry;
   accessing, by the hardware controller, baseline motion sense data indicative of entry point surveying, including:
      sending a request to a back-end server to access a portion of the baseline motion sense data indicative of entry point surveying, and
      receiving, from the back-end server, the portion of the baseline motion sense data;
   comparing, by one or more processors of the hardware controller, the received motion sense data to the portion of the baseline motion sense data received from the back-end server, including determining that the received motion sense data is consistent with the entry point surveying; and
   responsive to the comparing:
      generating a notification that indicates (i) the entry point surveying, and (ii) the area of the property corresponding to the received sensor data, and
      communicating the notification to an electronic device of an individual associated with the property.

2. The computer-implemented method of claim 1, further comprising:
   receiving, from the electronic device, a request initiated by the individual to activate a set of lights associated with the area of the property.

3. The computer-implemented method of claim 2, further comprising:
   in response to receiving the request from the electronic device, activating the set of lights associated with the area of the property.

4. The computer-implemented method of claim 1, further comprising:
   responsive to the comparing, activating an alarm within the property.

5. The computer-implemented method of claim 1, further comprising:
   responsive to the comparing, communicating the notification to a law enforcement entity.

6. The computer-implemented method of claim 1, wherein comparing the received motion sense data to the portion of the baseline motion sense data comprises:
   calculating a similarity percentage between the received motion sense data and the portion of the baseline motion sense data.

7. The computer-implemented method of claim 1, wherein receiving the sensor data comprises:
   receiving the sensor data during a specific time period.

8. The computer-implemented method of claim 1, wherein to compare the received motion sense data to the portion of the baseline motion sense data, the processor is configured to:
   calculate a similarity percentage between the received motion sense data and the portion of the baseline motion sense data.

9. The computer-implemented method of claim 1, wherein the processor receives the sensor data during a specific time period.

10. A hardware controller for detecting property intrusion within a property, the hardware controller in communication with a set of devices populated within the property, comprising:
    a transceiver interfacing with the set of devices populated within the property;
    a memory storing non-transitory computer executable instructions; and
    a processor interfacing with the transceiver and the memory, wherein the processor is configured to execute the non-transitory computer executable instructions to cause the processor to:
       receive, via the transceiver, sensor data from at least one device of the set of devices, wherein the sensor data (i) indicates a location of the at least one sensor within the property, and (ii) comprises motion sense data, audio data, and digital image data,
       identify, based on the location indicated in the sensor data, an area of the property corresponding to the received sensor data,
       analyze the motion sense data in combination with the audio data and the digital image data to determine that a combination of the motion sense data, the audio data, and the digital image data indicates a person surveying the property for a point of entry,
access baseline motion sense data indicative of entry point surveying, including:
  send a request to a back-end server to access a portion of the baseline motion sense data indicative of entry point surveying, and
  receive, from the back-end server, the portion of the baseline motion sense data,
compare the received motion sense data to the portion of the baseline motion sense data received from the back-end server, including determining that the received motion sense data is consistent with the entry point surveying, and
responsive to the comparing:
  generate a notification that indicates (i) the entry point surveying, and (ii) the area of the property corresponding to the received sensor data, and
  transmit, via the transceiver, the notification to an electronic device of an individual associated with the property.

11. The hardware controller of claim 10, wherein the processor is further configured to:
  receive, from the electronic device via the transceiver, a request initiated by the individual to activate a set of lights associated with the area of the property.

12. The hardware controller of claim 11, wherein the processor is further configured to:
  in response to receiving the request from the electronic device, activate the set of lights associated with the area of the property.

13. The hardware controller of claim 10, wherein the processor is further configured to:
  responsive to the comparing, activate an alarm within the property.

14. The hardware controller of claim 10, wherein the processor is further configured to:
  responsive to the comparing, communicate, via the transceiver, the notification to a law enforcement entity.

* * * * *